(12) United States Patent
Vincelette (10) Patent No.: US 7,672,545 B2
(45) Date of Patent: Mar. 2, 2010

(54) METHODS AND APPARATUSES FOR OBTAINING INFORMATION REGARDING SENSORS IN OPTICAL PATHS

(75) Inventor: André R. Vincelette, Deux-Montagnes (CA)

(73) Assignee: LXDATA Inc., Saint-Laurent, Quebec (CA)

( * ) Notice: Subject to any disclaimer, the term of this patent is extended or adjusted under 35 U.S.C. 154(b) by 0 days.

(21) Appl. No.: 11/915,361

(22) PCT Filed: May 23, 2006

(86) PCT No.: PCT/CA2006/000842

§ 371 (c)(1),
(2), (4) Date: May 27, 2008

(87) PCT Pub. No.: WO2006/125307

PCT Pub. Date: Nov. 30, 2006

(65) Prior Publication Data

US 2008/0292237 A1    Nov. 27, 2008

Related U.S. Application Data

(60) Provisional application No. 60/683,355, filed on May 23, 2005.

(51) Int. Cl.
*G02B 6/00* (2006.01)

(52) U.S. Cl. .......................................... 385/12; 385/13
(58) Field of Classification Search ........................ None
See application file for complete search history.

(56) References Cited

U.S. PATENT DOCUMENTS

| 5,363,463 | A | 11/1994 | Kleinerman |
| 5,451,772 | A | 9/1995 | Narendran |
| 5,506,674 | A | 4/1996 | Inoue et al. |
| 6,253,014 | B1 | 6/2001 | Simon et al. |
| 7,433,551 | B2 * | 10/2008 | Poland et al. ................. 385/12 |
| 2006/0257066 | A1 * | 11/2006 | Hill et al. ...................... 385/12 |

FOREIGN PATENT DOCUMENTS

| EP | 0 290 243 A2 | 11/1988 |
| JP | 09319462 A | 12/1997 |
| WO | WO 98/27406 | 6/1998 |
| WO | WO 00/39532 | 7/2000 |
| WO | PCT/CA2006/000842 | 10/2006 |

* cited by examiner

Primary Examiner—Omar Rojas (57) ABSTRACT

Methods and apparatuses for obtaining information, such as location and/or identification information, regarding sensors in optical paths such as optical fibers. One embodiment provides a method for identifying a location of a tag in an optical path. The tag is (1) adapted for producing a response to an optical signal propagating along the optical path; and (2) responsive to a variation of a physical parameter to vary the response to the optical signal. The method comprises causing a variation of the physical parameter and identifying the location of the tag at least in part by observing the response of the tag to the optical signal. The tag may be associated with a sensor such that a location of the sensor may be derived based on the location of the tag.

49 Claims, 8 Drawing Sheets

METHODS AND APPARATUSES FOR OBTAINING INFORMATION REGARDING SENSORS IN OPTICAL PATHS

CROSS-REFERENCE TO RELATED APPLICATION

This application claims priority from U.S. Provisional Patent Application Ser. No. 60/683,355 filed on May 23, 2005 and hereby incorporated by reference herein.

FIELD OF THE INVENTION

The present invention relates to methods and apparatuses for obtaining information, such as location and/or identification information, regarding sensors in optical paths such as optical fibers.

BACKGROUND

A wide variety of technical applications require sensors located at different locations. Often, the sensors use optical fibers to transmit information to a processing entity. When the number of sensors is large, their exact location sometimes becomes difficult to determine.

Traditionally, location and/or identification of sensors is done by attaching a visible tag to an optical fiber lead connecting to each individual sensor. This method of identification and/or location is prone to errors since tags may be mislabeled, may become detached from the optical fiber lead, and/or may be improperly referenced on a plan or map of the entire system layout. When one or more of these potential problems occurs in practice, it may be difficult to precisely locate and/or identify a specific sensor. This difficulty is compounded when sensors are part of a system that is routed through hard to reach locations such as conduits or walls.

Proposed solutions to impregnate embedded optical fibers with special materials that can be traced with sophisticated technology are costly and sometimes hard to implement and may even create health hazards. An example is described in U.S. Pat. No. 6,253,014 proposing an X-ray system for tracing optical fibers coated with a special coating that is opaque to X-ray radiation.

Against this background, it clearly appears that a need exists for more practical and less expensive solutions to obtain location information and/or identification information regarding sensors in optical paths such as optical fibers.

SUMMARY OF THE INVENTION

According to a first broad aspect, the present invention provides a method for identifying a location of a tag in an optical path. The tag is (1) adapted for producing a response to an optical signal propagating along the optical path; and (2) responsive to a variation of a physical parameter to vary the response to the optical signal. The method comprises causing a variation of the physical parameter; and identifying the location of the tag at least in part by observing the response of the tag to the optical signal.

According to a second broad aspect, the present invention provides a system for identifying a location of a tag in an optical path. The tag is (1) adapted for producing a response to an optical signal propagating along the optical path; and (2) responsive to a variation of a physical parameter to vary the response to the optical signal. The system comprises a physical parameter variation inducing unit for causing a variation of the physical parameter. The system also comprises a processing entity for processing the response of the tag to the optical signal to identify the location of the tag.

According to a third broad aspect, the present invention provides a cable. The cable comprises an optical fiber and a pathway extending along the optical fiber for receiving and guiding a physical parameter variation inducing unit adapted to cause a variation of a physical parameter at different sites along the optical fiber.

According to a fourth broad aspect, the present invention provides a probe for insertion in a cable comprising an optical fiber to induce a variation of a physical parameter at a selected site on the optical fiber. The probe comprises a generally elongated body for insertion in the cable and a part for inducing the variation of the physical parameter.

According to a fifth broad aspect, the present invention provides an optical device comprising an optical path and a sensor in the optical path for producing a first response to a first optical signal propagating along the optical path. The sensor is responsive to a variation of a physical parameter to vary the first response to the first optical signal. The optical device also comprises a tag in the optical path and associated with the sensor. The tag is adapted for producing a second response to a second optical signal propagating along the optical path, the second response conveying identification information associated with the sensor.

According to a sixth broad aspect, the present invention provides a method for identifying a sensor in an optical path. The sensor is (1) adapted for producing a first response to a first optical signal propagating along the optical path; and (2) responsive to a variation of a physical parameter to vary the first response to the first optical signal. The method comprises:

providing a tag in the optical path and associated with the sensor, the tag being adapted for producing a second response to a second optical signal propagating along the optical path, the second response conveying identification information from the tag; and identifying the sensor at least in part based on the identification information.

According to a seventh broad aspect, the present invention provides a sensor for producing a response to an optical signal. The sensor is responsive to a variation of a physical parameter to vary the response to the optical signal, the response to the optical signal conveying (1) information regarding the physical parameter; and (2) identification information regarding the sensor.

According to a eighth broad aspect, the present invention provides a method for obtaining information from a sensor in an optical path. The sensor is (1) adapted for producing a response to an optical signal propagating along the optical path; and (2) responsive to a variation of a physical parameter to vary the response to the optical signal. The method comprises:

introducing an optical signal in the optical path;

detecting at least one response of the sensor to the optical signal; and deriving from the at least one response:

information regarding the physical parameter; and identification information regarding the sensor.

According to a ninth broad aspect, the present invention provides a sensing system. The sensing system comprises a plurality of sensors and at least one optical fiber establishing a respective optical path to each of the sensors. The sensing system also comprises a plurality of tags optically coupled to the at least one optical fiber. Each tag is associated with a respective one of the sensors and is adapted for producing a response to an optical signal propagating in the at least one optical fiber. The responses of the tags are distinguishable from one another.

According to a tenth broad aspect, the present invention provides an apparatus for discriminating responses of sensors located in an optical network. The apparatus comprises an input for sensing responses produced by the sensors to at least one optical signal propagating in the optical network. The apparatus also comprises a processing entity for processing the responses to associate a given one of the responses to a given one of the sensors at least in part based on a time difference occurring between sensing of individual ones of the responses at the input.

According to an eleventh broad aspect, the present invention provides an optical network comprising a plurality of sensors located remotely from one another. Each sensor is adapted for producing a respective response to an optical signal propagating in the optical network. Each response conveys an identical identifier.

According to a twelfth broad aspect, the present invention provides an optical device comprising a waveguide portion allowing propagation of an optical signal. The optical device also comprises a sensor in the waveguide portion for producing a response to the optical signal, the response conveying information regarding a physical parameter. The optical device also comprises a metallic coating on the waveguide portion and a structural component secured to the metallic coating. The structural component is adapted for communicating a physical force to the sensor. The sensor is responsive to the physical force to vary the response to the optical signal.

According to a thirteenth broad aspect, the present invention provides an optical device comprising a waveguide portion allowing propagation of an optical signal. The optical device also comprises a sensor in the waveguide portion for producing a response to the optical signal, the response conveying information regarding a physical parameter. The optical device also comprises a plurality of structural components secured to the waveguide portion to transmit a physical force to the sensor when a first one of the structural components tends to move relative to a second one of the structural components. The sensor is responsive to the physical force to vary the response to the optical signal.

According to a fourteenth broad aspect, the present invention provides a sensing system comprising a waveguide portion allowing propagation of an optical signal. The sensing system also comprises a sensor in the waveguide portion for producing a response to the optical signal, the sensor being responsive to a variation of a physical parameter to vary the response to the optical signal. The sensing system also comprises a source of disturbance located remotely from the waveguide portion. The source of disturbance is adapted for causing a disturbance that propagates via a medium between the source of disturbance and the waveguide portion and that induces a variation of the physical parameter at the waveguide portion.

According to a fifteenth broad aspect, the present invention provides an apparatus for deriving information regarding a characteristic of a medium adjacent a waveguide portion that includes a sensor. The sensor is adapted for producing a response to an optical signal propagating in the waveguide portion. The apparatus comprises an input for sensing the response to the optical signal and a processing unit for processing the response to the optical signal to derive information regarding the characteristic of the medium.

According to a sixteenth broad aspect, the present invention provides an apparatus for processing an optical fiber. The apparatus comprises a first station for removing a coating of the optical fiber to expose a waveguide portion of the optical fiber. The apparatus also comprises a second station for creating a sensor on the waveguide portion of the optical fiber. The apparatus also comprises a third station to coat the waveguide portion of the optical fiber with material to form a new coating on the waveguide portion. The first station, second station, and third station define a path for receiving a continuous length of the optical fiber.

According to a seventeenth broad aspect, the present invention provides a method for processing an optical fiber. The method comprises:
   removing a coating of the optical fiber to expose a waveguide portion of the optical fiber;
   creating a sensor on the waveguide portion of the optical fiber; and
   coating the waveguide portion of the optical fiber with material to form a new coating on the waveguide portion of the optical fiber;

wherein the removing, creating and coating are effected on a continuous length of the optical fiber.

According to an eighteenth broad aspect, the present invention provides an apparatus for processing an optical fiber. The apparatus comprises a first station for removing a coating of the optical fiber to expose a waveguide portion of the optical fiber. The apparatus also comprises a second station to coat the waveguide portion of the optical fiber with material to form a new coating on the waveguide portion of the optical fiber. The first station and the second station define a path for receiving a continuous length of the optical fiber.

According to a nineteenth broad aspect, the present invention provides a method for processing an optical fiber. The method comprises
   removing a coating of the optical fiber to expose a waveguide portion of the optical fiber; and
   coating the waveguide portion of the optical fiber with material to form a new coating on the waveguide portion of the optical fiber;

wherein the removing and the coating are effected on a continuous length of the optical fiber.

These and other aspects and features of the invention will now become apparent to those of ordinary skill in the art upon review of the following description of certain embodiments of the invention in conjunction with the accompanying drawings.

BRIEF DESCRIPTION OF THE DRAWINGS

A detailed description of certain embodiments of the present invention is provided below with reference to the following drawings in which.

In the drawings, embodiments of the invention are illustrated by way of example. It is to be expressly understood that the description and drawings are only for purposes of illustration and are an aid to understanding. They are not intended to be a definition of the limits of the invention.

DETAILED DESCRIPTION OF EMBODIMENTS

Figure 1:
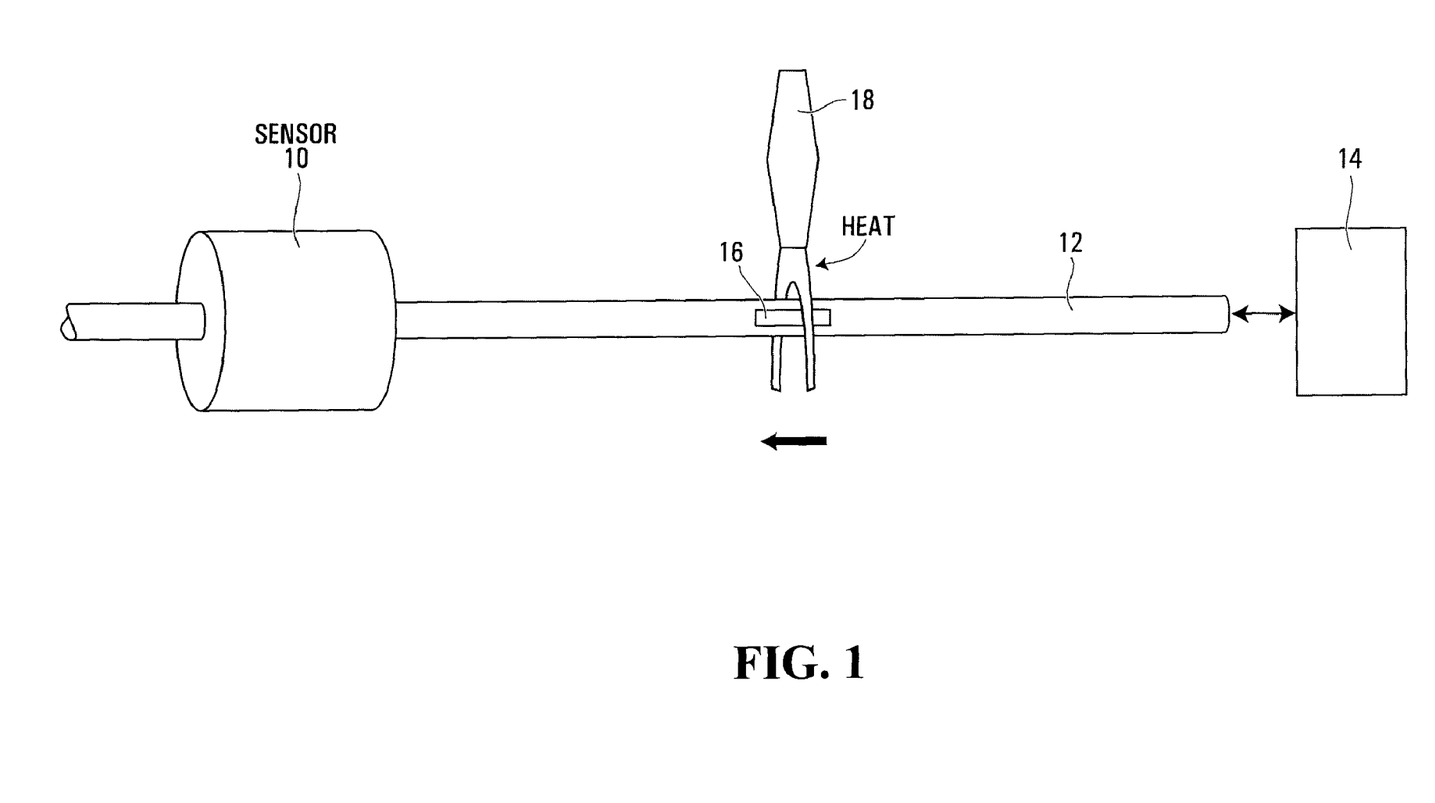
FIG. 1 diagrammatically illustrates a sensing system comprising a sensor coupled to an optical path for providing information regarding a physical parameter, a tag coupled to the optical path for locating the sensor, and a physical parameter variation inducing unit for interacting with the tag, according to an embodiment of the present invention.

FIG. 1 illustrates an embodiment of a system that comprises a sensor 10 optically coupled to an optical path such as an optical fiber 12. The sensor 10 is designed to sense a physical parameter $P_1$ and to deliver information on that physical parameter $P_1$ over the optical fiber 12 to a processing entity 14. Examples of the physical parameter $P_1$ include temperature, mechanical strain, pressure, and electromagnetic field intensity, among others. The sensor 10 can be designed either to generate an output signal that it sends to the processing entity 14, or to respond to an optical interrogation signal sent by the processing entity 14. Specifically, the processing entity 14 may inject in the optical fiber 12 an optical signal such as laser light which is altered by the sensor 10. The altered optical signal is picked up by reflection, transmission or diffraction and the processing entity 14 can determine the information regarding the physical parameter $P_1$ that the sensor 10 is outputting by analyzing alterations induced by the sensor 10.

While FIG. 1 illustrates a single sensor 10 in the optical path defined by the optical fiber 12, it is to be understood that a wide variety of sensor arrangements including any number of sensors 10 may be implemented. For example, a plurality of sensors 10, designed to sense the same physical parameter or different physical parameters, can be placed in series along the optical fiber 12. In such a case, the processing entity 14 may selectively interrogate any one of those sensors 10 by using known optical signal processing techniques. Examples of such techniques include wavelength multiplexing, time-domain multiplexing, phase multiplexing, polarization state multiplexing, or a combination thereof. Furthermore, although FIG. 1 shows the processing entity 14 as being optically connected to a single optical path formed by the optical fiber 12, it is to be understood that the processing entity 14 may be optically connected to one or more optical paths such as one or more optical fibers 12.

With continued reference to FIG. 1, a tag 16 is associated with the sensor 10 in order to facilitate location and/or identification of the sensor 10. For instance, the tag 16 may be located in close proximity to the sensor 10. In a specific example, the tag 16 may be located at a predetermined distance from the sensor 10. For example, in one embodiment, the tag 16 may be located at a distance of, say, 5 cm from an optical fiber lead that connects the sensor 10 to the optical fiber 12. In this type of embodiment, the sensor 10 may be manufactured by permanently attaching it to a short length of optical fiber, called an optical fiber lead, which carries at its free end a connector. During installation of the sensor 10, the connector is attached to the optical fiber 12 such as to establish an optical path directly to the sensor 10.

The tag 16 is adapted to produce a response to an optical signal propagating along the optical fiber 12. The tag 16 is also responsive to a variation of a physical parameter $P_2$ to vary the response to the optical signal. Examples of the physical parameter $P_2$ include temperature, mechanical strain, and magnetic field intensity, among others. The physical parameter $P_2$ may be the same physical parameter $P_1$ that the sensor 10 is designed to sense or a different physical parameter. Thus, the response of the tag 16 to the optical signal propagating along the optical fiber 12 changes depending on the variation of the physical parameter $P_2$ that exists locally of the tag 16. By observing the response of the tag 16 induced by the optical signal, it can be determined if the variation of the physical parameter $P_2$ is present or absent in the vicinity of the tag 16.

In one embodiment, the tag 16 may include as a Bragg grating. A Bragg grating is a small structure created in a waveguide portion of an optical fiber. The Bragg grating may be designed to reflect a portion of an optical signal at a specific wavelength, i.e., a portion of the optical signal in a range of wavelengths around that specific wavelength. Bragg gratings can be interrogated by inputting in the optical fiber a broadband or sweeping signal and detecting a portion of the signal either reflected or transmitted.

In another embodiment, long period gratings can be used. Long period gratings are structures etched or embedded in an optical fiber that diffract a portion of a light signal at a specific wavelength into the fibers cladding, so they can be interrogated in transmission, but not in reflection.

In other embodiments, the tag 16 may include any other type of grating such as a blazed grating, a chirp grating, an apodized grating, a non-reflective grating, a non-dispersive grating, or may include a predetermined axial profile of refractive index of the optical fiber.

Since gratings are structures that can be made up of interfaces of different refractive indices, they can be identified with an optical time-domain reflectometer (OTDR) or other pulse propagation analyzer. As a result, these structures can be interrogated simultaneously using frequency, time-domain, phase, and/or polarization state multiplexing with standard optical interrogation units, which could be used for interrogation of sensors such as the sensor 10. Also, since gratings are usually small, typically having a length less than a centimeter, they can be positioned with ease and precision along an optical fiber length. Thus, during design, fabrication, assembly and installation of the sensing system shown in FIG. 1, it may be relatively easy to accurately position the tag 16 with respect to the sensor 10.

When the tag 16 is implemented as a Bragg grating, a long-period grating, or other type of grating, a variation of the physical parameter $P_2$ acting on the grating will have a tendency to change the wavelength at which the grating reflects, absorbs or diffracts light. In a typical grating, the induced wavelength variation can be viewed as being linear. Thus, a variation of the physical parameter $P_2$ (e.g., a temperature variation or a strain variation) affecting a portion of the optical fiber 12 that contains the grating can be viewed as resulting in a linear variation of the response produced by the grating. By observing the response, namely determining if there is a change in the wavelength that is reflected, absorbed or diffracted, one can determine if the variation of the physical parameter $P_2$ is present or not. In addition, a variation observed in the grating's response can be used to determine how close the variation of the physical parameter $P_2$ is to the grating.

A variation of the physical parameter $P_2$ can be controllably induced in various manners using a "physical parameter variation inducing unit". In the embodiment of FIG. 1, the physical parameter variation inducing unit is implemented as a fork 18 with two prongs that is adapted to induce a localized temperature increase in the optical fiber 12. In this example, the two prongs of the fork 18 are provided with heating elements that can slightly elevate the temperature of a portion of the optical fiber 12 that is straddled by the fork 18. By displacing the fork 18 along the optical fiber 12 and observing the response of the tag 16 to the optical signal propagating along the optical fiber 12, it is possible to determine when the fork 18 is adjacent to the tag 16. Specifically, the response of the tag 16 will be constant and will not vary except when the fork 18 is adjacent to the tag 16. A maximal variation in the response of the tag 16 should correspond to the position shown in FIG. 1 where the fork 18 is located exactly at the tag 16, thus creating a maximal local temperature increase. It will be appreciated that a similar effect can be obtained in other embodiments by locally cooling the optical fiber 12, i.e., inducing a localized temperature decrease.

In other embodiments, the physical parameter variation inducing unit may effect a variation of mechanical strain on the optical fiber 12. This may be achieved, for example, by using mechanical or manual means to bend the optical fiber 12 or apply an axial force (tensile or compressive) on the optical fiber 12 in order to induce a localized strain variation. In yet other embodiments, the physical parameter variation inducing unit may effect a variation of magnetic field intensity. In such embodiments, a portion of the optical fiber 12 where the tag 16 is located may be provided with a coating of material reactive to a magnetic field intensity variation (e.g., a magnetorestrictive coating) to effectively cause a strain variation on that portion.

Signal processing to observe the response of the tag 16 in order to detect a variation thereof can be performed in various ways. For example, in the embodiment of FIG. 1, the processing entity 14 that is used to collect information from the sensor 10 can also be used to collect and process the response of the tag 16. The processing entity 14 may have a light source such as a laser to inject an optical signal in the optical fiber 12 and a detector to sense signal reflections. The detector's output may be converted into a digital electrical signal that in turn can be processed in a computer-based module of the processing entity 14. The computer-based module may be programmed to detect a variation in the wavelength of the reflected light. In use, a human operator or an apparatus coupled to the processing entity 14 may locate the fork 18 on the optical fiber 12 and cause the fork 18 to move along the optical fiber 12. When the computer-based module detects a variation in the wavelength of the reflected light, it may issue to the human operator or to another component of the processing entity 14 an indication (e.g., a notification) that the fork 18 is located at the tag 16. That is, the location of the tag 16 is obtained. Since the tag 16 is located at a known and predetermined distance from the sensor 10, the position of the sensor 10 can be easily derived when the location of the tag 16 is known.

Figure 2:
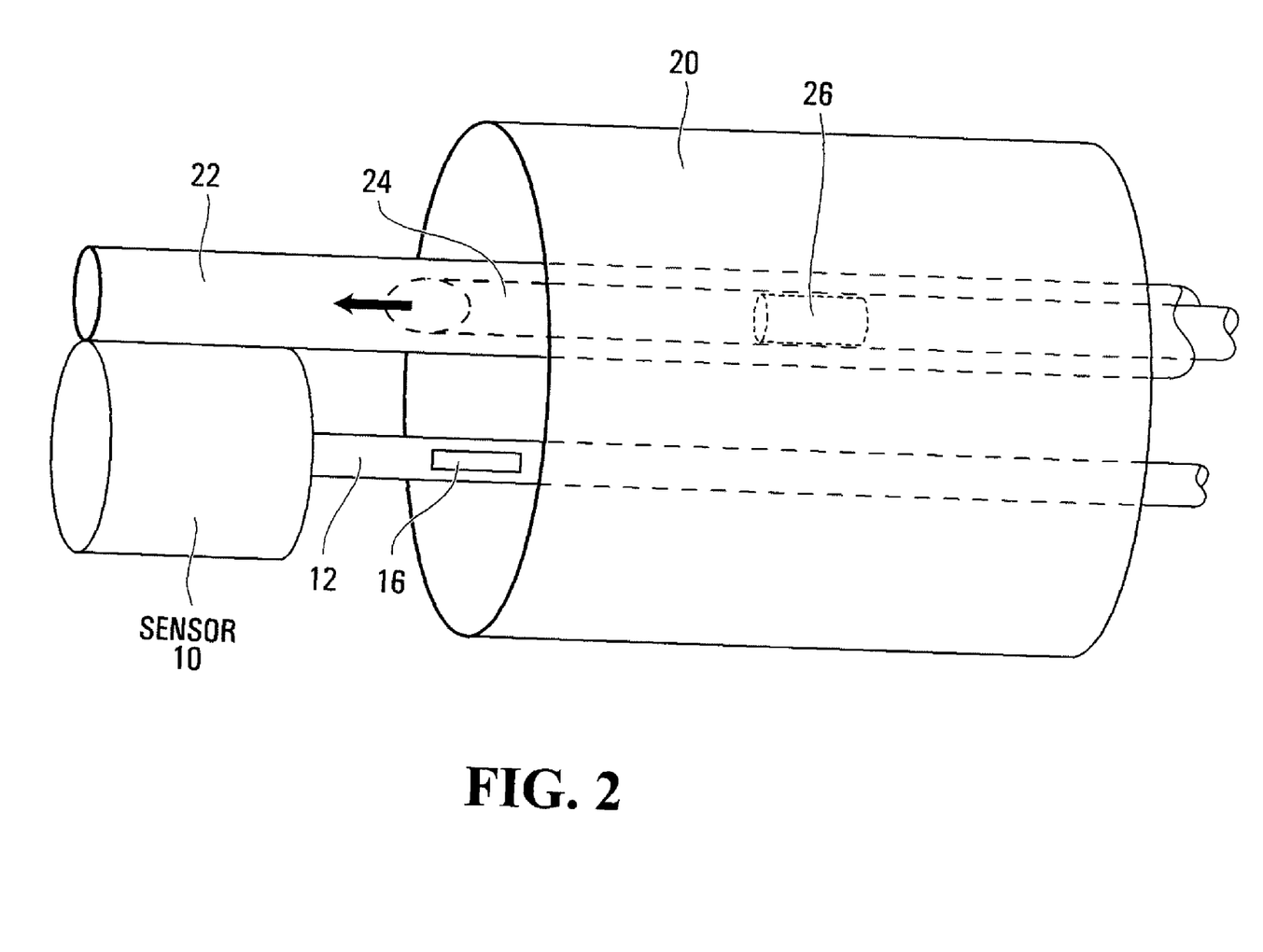
FIG. 2 diagrammatically illustrates a cable comprising an optical fiber and a pathway for receiving a physical parameter variation inducing unit adapted to be moved along the optical fiber, according to another embodiment of the present invention.
Figure 3:
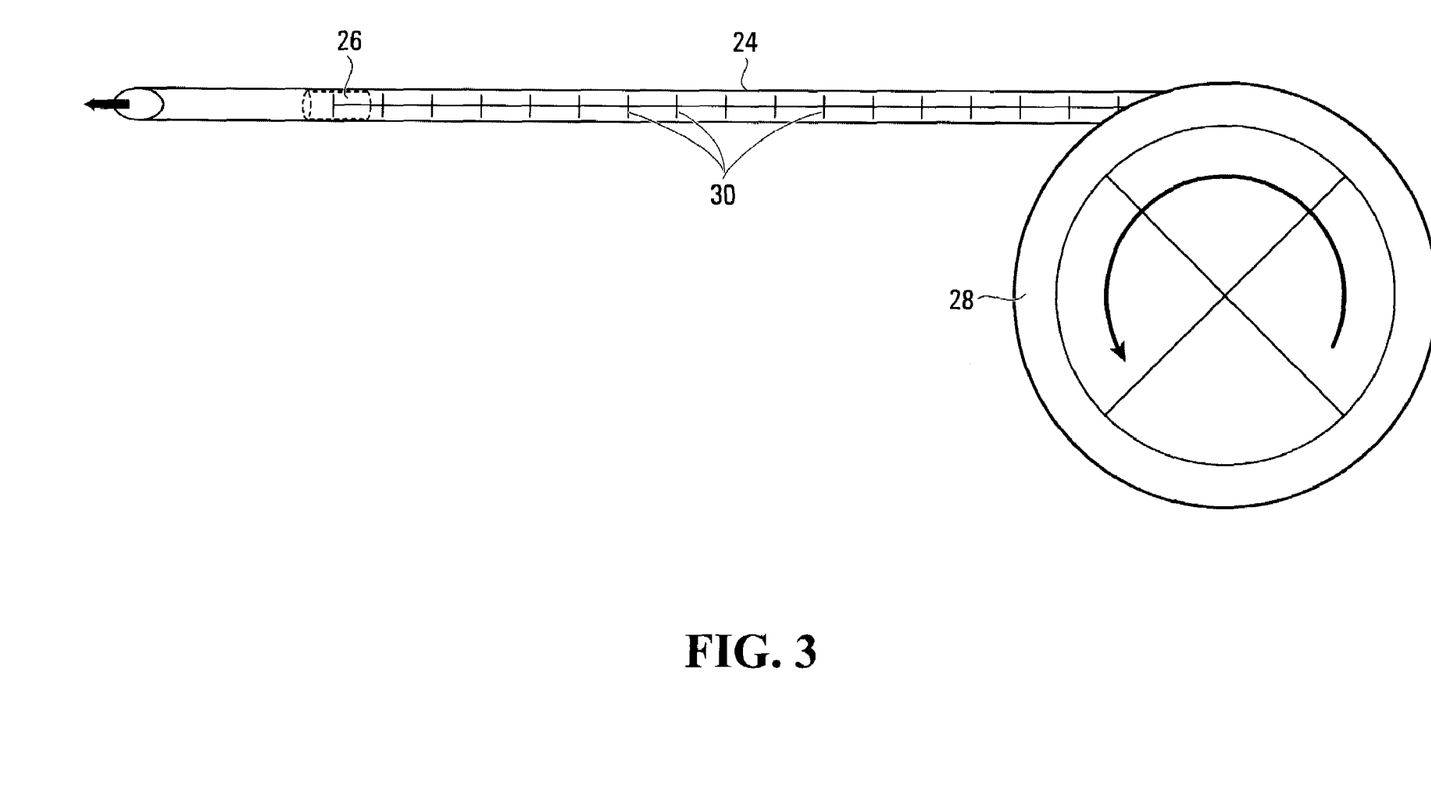
FIG. 3 is diagrammatic side elevation view of the physical parameter variation inducing unit partially shown in FIG. 2.

FIGS. 2 and 3 illustrate another embodiment where the optical fiber 12 and the sensor 10 are located within a cable 20. In such an embodiment, the fork 18 cannot be used because it cannot get close enough to the tag 16. The cable 20 has a pathway that is defined, in this example, by a conduit 22 through which the physical parameter variation inducing unit implemented as an excitation probe 24 can be moved along the optical fiber 12. The excitation probe 24 has a heated part 26 so as to induce a local temperature increase in a portion of the optical fiber 12 that is in proximity to the heated part 26. An embodiment of the excitation probe 24 is shown in greater detail in FIG. 3. In this embodiment, the excitation probe 24 is in the form of an elongated rod that is sufficiently flexible to be wound on a reel 28. In use, a tip of the excitation probe 24 is placed in the conduit 22 and the excitation probe 24 is progressively inserted along the optical fiber 12 while the response of the tag 16 is monitored. The outside surface of the excitation probe 24 can be provided with graduations 30 allowing a technician that is inserting the excitation probe 24 to readily determine penetration depth and, accordingly, the location of the heated part 26. In other implementations, penetration depth of the excitation probe 24 and thus location of the heated part 26 may be determined in various other manners by a human operator or a machine. Based on the location of the heated part 26, the location of the tag 16 and thus the location of the sensor 10 may be derived.

Figure 4:
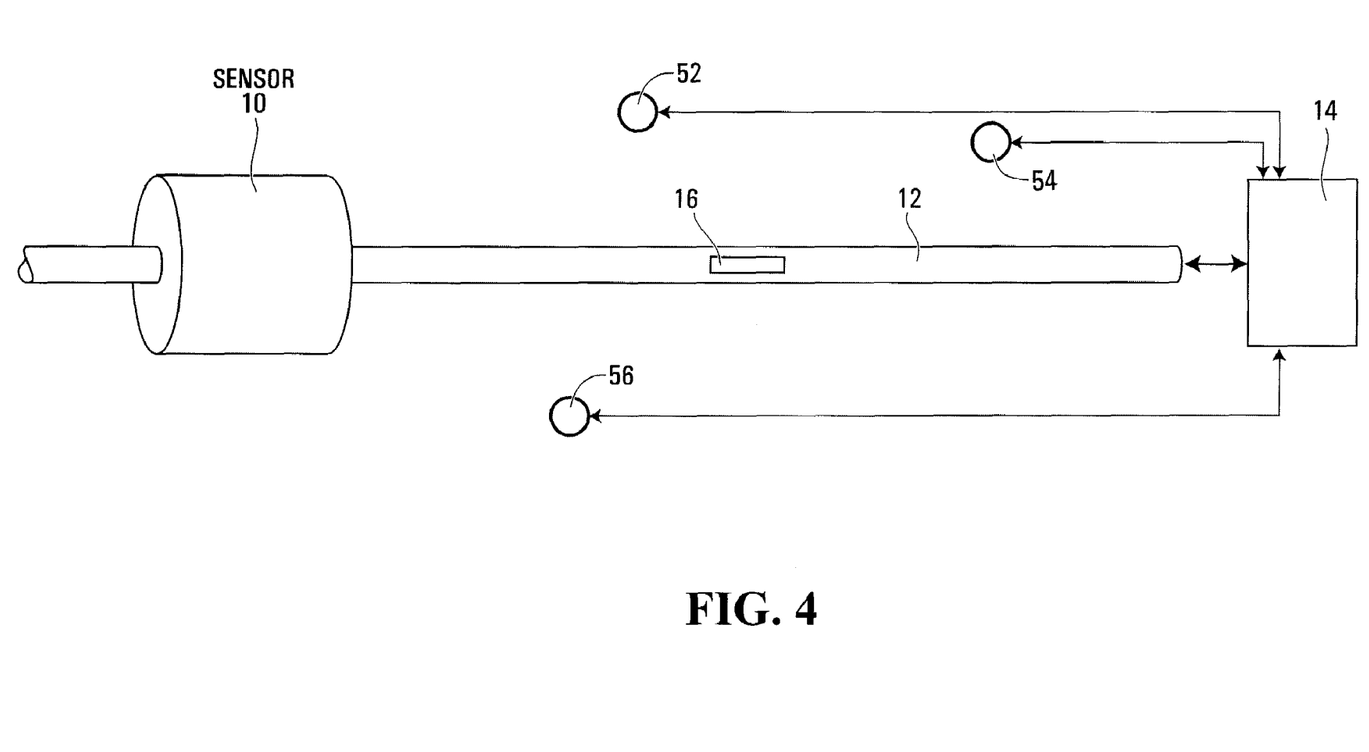
FIG. 4 diagrammatically illustrates a sensing system comprising a sensor coupled to an optical path for providing information regarding a physical parameter, a tag coupled to the optical path for locating the sensor, and a plurality of physical parameter variation inducing units for interacting with the tag, according to another embodiment of the present invention.

FIG. 4 illustrates another embodiment where the tag 16 is subjected to physical parameter variations induced by a number of different physical parameter variation inducing units 52, 54, 56 that are spaced apart from one another. The processing entity 14 detects and processes the response of the tag 16, which response is a combined response to the physical parameter variations induced by the physical parameter variation inducing units 52, 54, 56. In this example, three physical parameter variation inducing units 52, 54, 56 are shown. The physical parameter variation inducing units 52, 54, 56 can be used to induce variations of the same physical parameter or different physical parameters. The position of the tag 16 relative to the position of the physical parameter variation inducing units 52, 54, 56 can be accurately determined by computing the time taken for the physical parameter variation induced by each unit 52, 54, 56 to arise at the tag 16. This computation can be made by first noting the time at which each physical parameter variation inducing unit 52, 54, 56 sources 52 is activated and then observing the response of the tag 16 to note the time at which the respective physical parameter variation will arise at the tag 16. The difference represents a time of travel of the physical parameter variation from each physical parameter variation inducing unit 52, 54, 56 to the tag 16. Known algorithms can be used to determine on the basis of this time of travel information (and possibly information regarding spatial propagation of the physical parameter variations) the position of the tag 16 with relation to the physical parameter variation inducing units 52, 54, 56. One such algorithm can be based on a Global Positioning System (GPS) that determines the position of an object with relation to satellites on the basis of time of travel of a signal. The number of physical parameter variation inducing units 52, 54, 56 used determines the accuracy of the resulting determination of position of the tag 16. Specifically, at least three physical parameter variation inducing units 52, 54, 56 are required to perform a three-dimensional position location, but a fourth source may be used to increase the accuracy by resolving position ambiguities.

Figure 5:
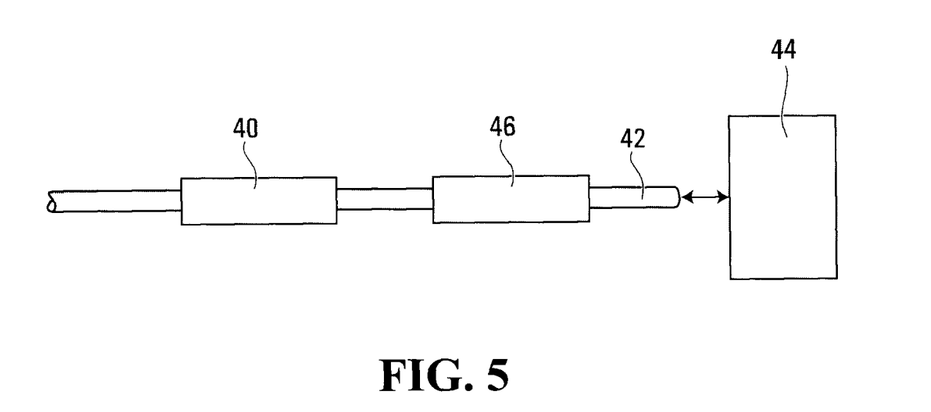
FIG. 5 diagrammatically illustrates a sensing system comprising a sensor coupled to an optical path for providing information regarding a physical parameter and a tag coupled to the optical path for providing identification information regarding the sensor, according to another embodiment of the present invention.

FIG. 5 illustrates another embodiment of a system for measuring a physical parameter $P_1$ by using a sensor 40 placed in an optical path 42. In this embodiment, the optical path 42 is an optical fiber. The sensor 40 may be one or a combination of components selected in the group consisting of a Bragg grating, a long period grating, a blazed grating, a chirp grating, an apodized grating, a non-reflective grating and a non-dispersive grating. The sensor 40 is adapted to manifest a response to an optical interrogation signal input in the optical path 42 by a processing entity 44. A variation of the physical parameter $P_1$ changes the response of the sensor 40 to the optical interrogation signal. In a specific example of implementation, this change is linear and can be used to obtain information about the physical parameter $P_1$ (e.g., a magnitude of the physical parameter $P_1$). The response of the sensor 40 may be determined by the processing entity 44 which assesses the reflection of the optical interrogation signal. As a possible variant, an assessment of absorption of the optical interrogation signal may be used, in which case a detector is required at the opposite end of the optical path 42.

A tag 46 is placed in the optical path 42 and is associated to the sensor 40. The tag 46 is adapted to manifest a response to an optical interrogation signal input in the optical path 42 by the processing entity 44, which may be the same optical interrogation signal used for the sensor 40 or a different optical interrogation signal. The response of the tag 46 includes identification information that can be extracted by the processing entity 44 in order to identify the sensor 40. In one embodiment, the tag 46 and the method for extracting the identification information can be constructed according to U.S. Pat. No. 5,506,674 issued to Inue et al. on Apr. 9, 1996 and hereby incorporated by reference herein.

An arrangement such as that shown in FIG. 5 can be used in instances where two or more sensors are present in an in optical network and it is desirable to distinguish them from one another.

In other embodiments, an arrangement such as that shown in FIG. 5 can be used to effect an alarm configuration by adding a filter structure (not shown) in the tag 46. For example, the filter structure may be a dispersive grating or a long period grating. The filter structure may be designed to block the response signal of the sensor 40 over a safe range and let it pass over an unsafe range such that when the response signal of the sensor 40 reaches the processing entity 44 an alarm signal may be emitted.

Figure 6:
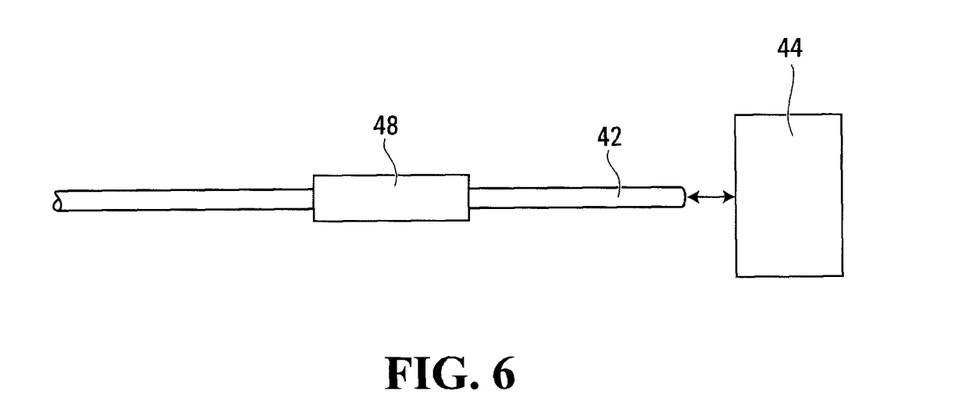
FIG. 6 diagrammatically illustrates a sensing system comprising a sensor coupled to an optical path for providing information regarding a physical parameter and identification information regarding the sensor, according to another embodiment of the present invention.

FIG. 6 is a variant of the system illustrated in FIG. 5 in which sensing functionality of the sensor 40 and identification functionality of the tag 46 are provided by a sensor 48 placed in the optical path 42. In this embodiment, the sensor 48 is adapted to provide a response to an optical interrogation signal input by the processing entity 44 in the optical path 42, where that response conveys two types of information, namely (1) information about the physical parameter $P_1$ and (2) identification information enabling identification of the sensor 48.

In one embodiment, the sensor 48 may be set to return identification information by using a multiple wavelength interrogation scheme. For instance, the sensor 48 can be made by a series of gratings, where each grating reflects at a given wavelength. The number of gratings that make up the sensor 48 is selected such as to provide a desired identifier (e.g., an identification code). For example, assuming that an identifier of 5 bits is desired, the sensor 48 may include five gratings or less, each designed to reflect light at five distinct wavelengths. By injecting in the optical path 42 an interrogation signal that is made up of a series of discrete wavelengths, the 5 bit identifier can be read.

For purposes of this example, consider that wavelengths A, B, C, D and E are successively input in the optical path 42 by the processing entity 44, where each signal injection is followed by a brief period of time sufficient to read the response of the sensor 48. Further assume for purposes of this example that the desired identifier is 11001. Therefore, the sensor 48 may have three gratings that reflect light at the wavelengths A, B and E, respectively. There will be no gratings reflecting at wavelengths C and D. In this fashion, the identifier can be read by the processing entity 44, where the presence of a reflection signals a binary 1 at a position in the identifier depending on the position of the wavelength in the interrogation sequence. Similarly, the absence of a response signals a binary 0.

When a variation of the physical parameter $P_1$ arises at the sensor 48, it may induce a strain on the sensor 48 that may change the exact wavelengths at which the series of gratings will reflect light. By spacing the wavelengths A to E sufficiently from one another such that variations that are caused by variations of the physical parameter $P_1$ will still allow a proper reading of the identifier, information regarding the physical parameter $P_1$ can also be obtained by assessing the difference between anyone of the reflected wavelengths and a nominal value. For example, with respect to wavelength A, consider that a reflected wavelength due to presence of a variation of the physical parameter $P_1$ can vary in the range from A− to A+d. Similar ranges may be established for wavelengths B, C, D and E. By selecting the adjacent wavelength B such that the range A−d to A+d and B−d to B+d do not overlap, then a reflected wavelength at any point in the range A−d to A+d will be properly read as an A wavelength. The variation or shift between the reflected wavelength and a nominal value can be used to determine a magnitude of the physical parameter $P_1$.

The above-described embodiment refers to scenarios where sensors such as the sensor 48 can be assigned unique identifiers. In other embodiments such as in applications where an optical network includes a relatively small number of sensors that are at a significant distance from one another, the sensors can all be constructed to generate the same response to the optical interrogation signal. In such embodiments, a discrimination can be made by analyzing a time of travel of the response.

Figure 7:
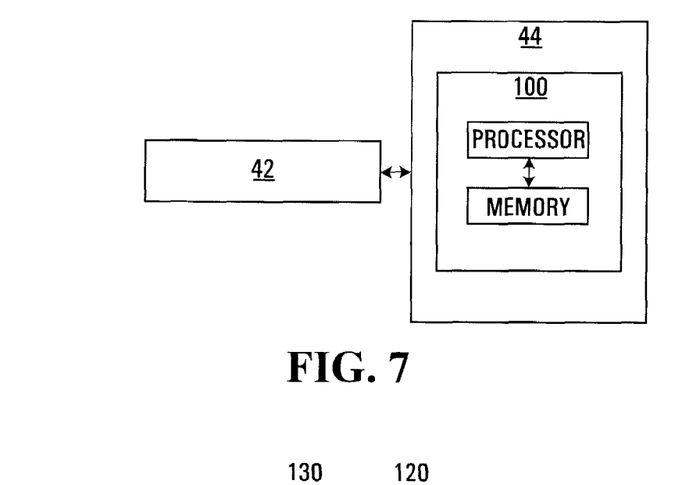
FIG. 7 diagrammatically illustrates an embodiment of a processing entity of the sensing system shown in FIG. 6.

For example, FIG. 7 is a block diagram depicting an embodiment of the processing entity 44. It will be appreciated that FIG. 7 may also represent a possible embodiment of the processing entity 14 shown in FIG. 1 and/or FIG. 4. In this embodiment, the processing entity 44 comprises a module 100 operative to perform interrogation of various sensors and/or tags of an optical network. Assume for example that three sensors such as the sensor 48 are placed in the optical path 42 and are located in a spaced apart relationship. The distance between the sensors is such that when an optical interrogation signal is injected in the optical path 42 by the processing entity 44, the individual responses of the sensors will be received at different times by the processing entity 44. This time difference allows distinguishing the responses from one another.

The module 100 is operative for causing generation of the optical interrogation signal and for monitoring the responses received from the individual sensors. In this example, the responses that are being monitored are the reflections of the sensors. A similar approach may be contemplated for absorption type responses, where the optical interrogation signal is injected in the optical path 42 at an end thereof that is opposite the processing entity 44.

In this embodiment, the module 100 is a computerized device that comprises a processor and memory, the processor executing software code that is stored in the memory. Suitable interfaces allow the module 100 to communicate with external devices, such as to initiate the optical interrogation and to collect data representative of the responses from the sensors. The memory also contains a database that stores location information of the various sensors one with relation to another or with relation to a common reference. When the module 100 initiates an information collection cycle, it issues a command to cause generation of an optical interrogation signal in the optical path 42. The optical interrogation signal will propagate along the optical path 42 and in response to this optical interrogation signal each sensor will produce a response. The responses will travel in the opposite direction toward the processing entity 44. Since the sensors are spaced from one another, the responses will be received at different times by the module 100. In this example where three sensors are placed in the optical path 42, the first response will be the one from the sensor closest to the processing entity 44, the second response with be the one from the sensor that is the next further away from the closest sensor, and the last response will be the one from the sensor furthest away. On the basis of the location information in the database, the module 100 can associate the responses to the respective sensors, in spite of the fact that each response contains the same identifier. Each response can then be further processed to extract the information regarding the physical parameter $P_1$.

The above-described approach may be very practical in that identical sensor structures can be used on an optical path, which may avoid having to create different sensor structures that generate unique identifiers.

Figure 8:
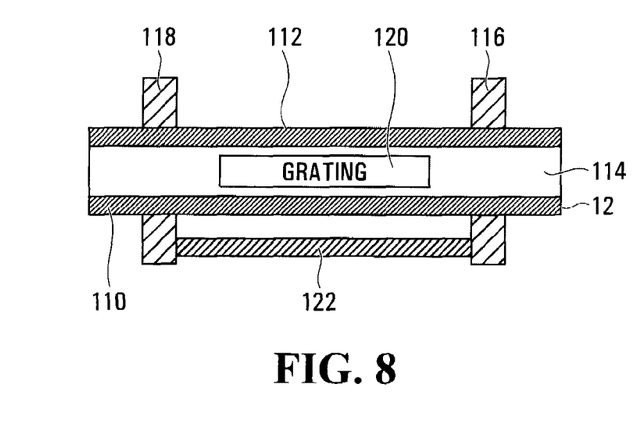
FIG. 8 is diagrammatic cross-sectional view of an optical fiber, taken along an axis of the optical fiber, according to another embodiment of the present invention.

FIG. 8 is a cross-sectional view of an optical fiber 112, taken along an axis of the optical fiber 112, in accordance with another embodiment. In this embodiment, the optical fiber 112 comprises a waveguide portion 114 having a grating 120. As described below, the grating 120 may be used to measure physical strain on the optical fiber 112. The optical fiber 112 also comprises a sheath 110 that surrounds the waveguide portion 114 to protect the waveguide portion 114 against physical damage.

In this embodiment, the sheath 110 is used as a vehicle to communicate physical strain from the environment of the optical fiber 112 to the waveguide portion 114. In other words, physical strain from the environment of the optical fiber 112 may be transmitted to the sheath 110 that will communicate this strain to the waveguide portion 114. The resultant distortion created on the grating 120 can be measured as described earlier in this specification. One possible mechanism to communicate physical strain to the sheath 110 includes a pair of rings 116 and 118 that have central apertures generally corresponding to an outer diameter of the sheath 110. The rings 116 and 118 are made of rigid material such as metal and they are affixed to an outer surface of the sheath 110 such as by adhesive. When forces applied to the rings 116 and 118 move them closer to or away from each other, a corresponding strain will be generated on the grating 120. For example, a rod 122 can be placed between the rings 116 and 118 so as to cause the rings 116 and 118 to move away from each other under the effect of thermal expansion or closer to each other under the effect of thermal contraction. By selecting the material from which the rod 122 is made, it is possible to precisely tailor the response of the grating 120 to a temperature variation.

Figure 9:
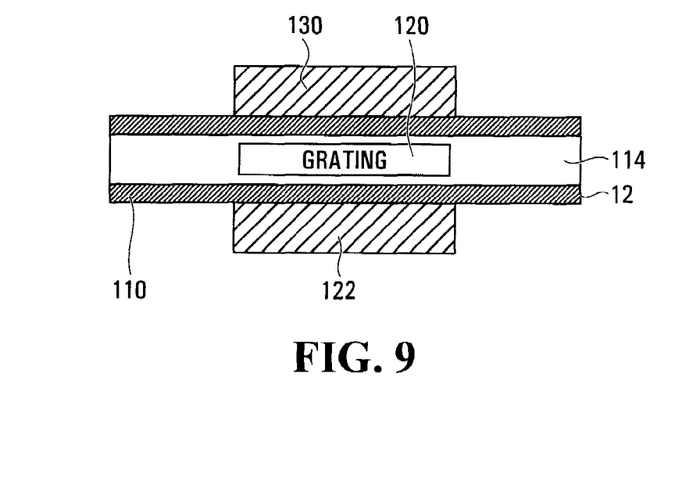
FIG. 9 is a variant of the embodiment shown in FIG. 8.

FIG. 9 illustrates a variant. In this embodiment, the sheath 110 of the optical fiber 112 is surrounded by an elongated ring 130 that is affixed to the sheath 110 such as by adhesive. The elongated ring 130 is made of material that under thermal expansion or contraction will cause a strain on the grating 120 that can be measured as discussed earlier.

In addition to measuring temperature, the embodiments shown in FIGS. 8 and 9 can also be used to measure mechanical displacement. For instance, in the embodiment of FIG. 8, the rings 116 and 118 may be affixed to respective structural components that move relative to each other. In such a case, the strain created on the grating 120 is representative of displacement of these structural components.

Figure 10:
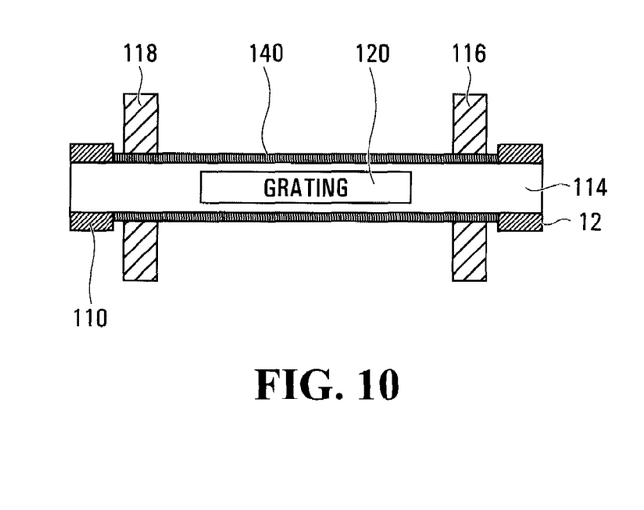
FIG. 10 is another variant of the embodiment shown in FIG. 8

FIG. 10 illustrates another embodiment in which a portion of the sheath 110 has been stripped or otherwise removed from an area of the optical fiber 112 in which the grating 120 is formed. The surface of the waveguide portion 114 in that area is covered by a metallic coating 140 that bonds to that surface. This metallization process can be effected by vapour deposition, which may be either physical vapour deposition or chemical vapour deposition. For example, the substrate to be coated, in this case the optical fiber 112 with the portion of the sheath 110 removed, is placed in a vacuum and the material that is to form the metallic coating 140 is vaporized. Depending on the specific process used, the vaporization can be made by bombarding the material with a high energy source such as a beam of electrons or ions to "free" the atoms that migrate to the surface of the substrate and create the metallic coating 140. The amount of material deposited on the waveguide portion 114 of the optical fiber 112 is determined by the amount of time the waveguide portion 114 is left exposed to the atoms steam.

The metallization process thus creates the metallic coating 140 that constitutes a good anchoring point allowing securing of external components directly to the waveguide portion 114. In this manner, strain can be communicated directly to the glass or other transparent material of the waveguide portion 114, allowing precise measurements. In the embodiment shown in FIG. 10, the rings 116 and 118 are affixed to the metallic coating 140 such as by adhesive or brazing. This embodiment is believed to provide an advantage over the embodiments shown in FIGS. 8 and 9 where strains are transmitted to the waveguide portion 114 via the sheath 110 that, due to its own resilience, dampens the forces transmitted. This is less likely to happen in the embodiment of FIG. 10 since the metallic coating 140 is far more rigid than the sheath 110.

As mentioned above, in some embodiments, the physical parameter variation inducing unit that may be used to locate a sensor may effect a localized variation of magnetic field intensity to achieve its location function. In such embodiments, the metallic coating 140 may be made of a material reactive to a magnetic field intensity variation to effectively cause a strain variation on the waveguide portion 140 that has the grating 120, thereby enabling location of that grating 120.

Figure 11:
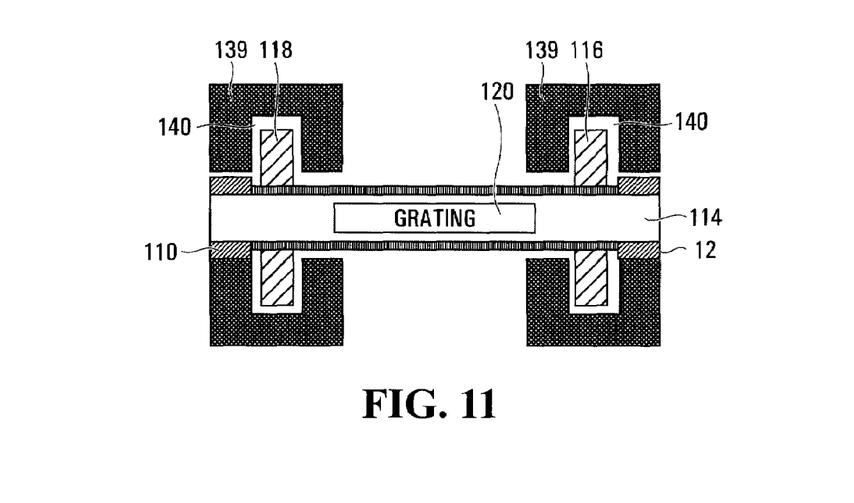
FIG. 11 diagrammatically illustrates a standardized mounting arrangement allowing a sensing unit to be attached to a structure on which measurements are to be made, according to another embodiment of the present invention.

FIG. 11 illustrates an embodiment of a standardized mounting arrangement allowing the set-up of FIG. 10 to fit in a base that can be attached to a structure (not shown) on which measurements are to be made. In this embodiment, the base comprises a set of four mounting elements 139 each defining a respective recess 140 intended to receive a respective portion of one of the rings 116 and 118. The dimensions of the recesses 140 closely match the dimensions of the rings 116 and 118 so as to eliminate as much as possible free play. The mounting elements 139 are mounted or affixed to any structure or environment on which measurements are to be made. In a specific example, the left-hand pair of mounting elements 139 (as seen in the drawings) and the right-hand pair of mounting elements 139 are mounted to respective parts or components of a system or structure that may undergo small relative displacement. This displacement can result from thermal expansion or relative mechanical motion. The resulting strain is transmitted to the grating 120.

This arrangement provides a standardized mounting configuration which makes installation of the optical fiber 112 and the grating 120 easy to accomplish. The installer only needs to secure the mounting elements 139 to the parts or components of the system or structure on which measurements are to be taken and then to insert the optical fiber 112 and the rings 116 and 118 in place. While not shown in FIG. 11, the mounting elements 139 may also be provided with a locking device (e.g., set screws) to prevent the rings 118 and 116 from being accidentally removed from the recesses 140.

Figure 12:
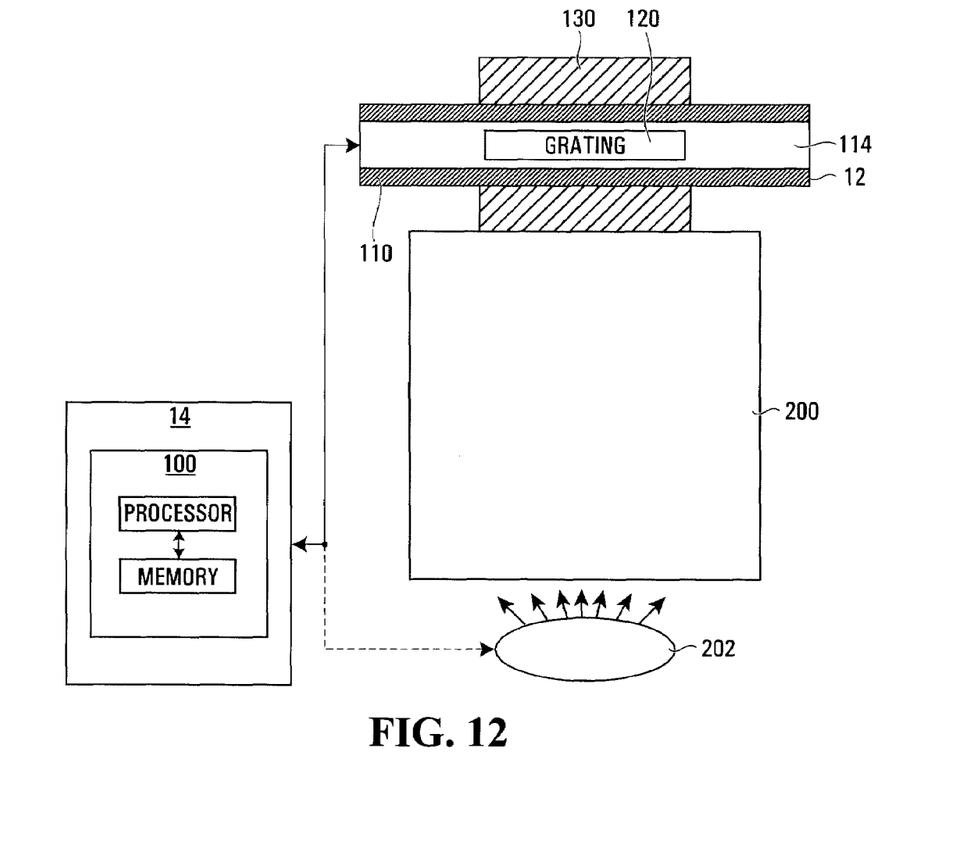
FIG. 12 diagrammatically illustrates a sensing arrangement for measuring one or more properties or conditions of a medium through which propagates a physical disturbance, according to another embodiment of the present invention.

FIG. 12 illustrates another embodiment in which a sensing arrangement such as that shown in FIG. 9 is used to provide measurements on a medium 200 through which a physical disturbance may propagate and be sensed by the grating 120. It will be appreciated that various other sensing arrangements may be used in other embodiments.

In this embodiment, the sensing arrangement is coupled to the processing entity 44 of the type shown in FIG. 7. Accordingly, the module 100 is responsible for generating optical interrogation signals and for picking up and analyzing responses of the grating 120 to those signals. It will be appreciated that other types of processing entities may be used in other embodiments.

The sensing arrangement is used to gather knowledge on the medium 200 through which may propagate a physical disturbance that can be sensed by the grating 120. For example, the medium 200 may be a block of solid material (e.g., metal). As another example, the medium 200 may be a fluid. For instance, the fluid can be a liquid such as water having a certain composition or containing a certain concentration of particles that may change the way the physical disturbance travels or manifests itself at the grating 120. Alternatively, the medium 200 can be a gas.

A source of disturbance 202 is provided to generate a physical disturbance that propagates through the medium 200. The physical disturbance can be anything that can be sensed by the grating 120. One example is vibration that will be transmitted through the medium 200 and sensed at the grating 120 as a series of rapid strain variations. Another example is temperature variation.

The physical disturbance that is sensed by the grating 120 conveys information about the medium 200. By analyzing the response of the grating 120, information regarding one or more characteristics of the medium 200, such as one or more properties or conditions of the medium 200, may be obtained. In this example, the analysis is performed by the module 100 of the processing entity 44. In one embodiment, the module 100 may store a catalogue of reference responses and may attempt to match a received response to any one of the reference responses. The reference responses are associated with one or more known characteristics of a medium such as the medium 200. For example, those characteristics can be composition, size, density, porosity, presence of cracks, and various other properties or conditions. The catalogue of reference responses may be in the form of one or more data files stored in the memory of the module 100. Logic implemented by the module 100 is operative to attempt matching the received response to any one of the reference responses by applying any suitable pattern matching algorithms. Accordingly, with this arrangement, one can determine one or more characteristics of the medium 200 in an easy and non-destructive fashion.

In some embodiments, the source of disturbance 202 may be a natural source, i.e., a source of a naturally occurring disturbance. In other embodiments, the source of disturbance 202 may be artificially controlled. In other words, it can be triggered to produce one or more physical disturbances propagating through the medium 200. FIG. 12 illustrates this possibility by showing a dashed arrow from the processing entity 44 to the source of disturbance 202. In such embodiments, the module 100 is adapted to trigger the source of disturbance 202 to produce a physical disturbance in any particular manner suitable for the measurement to be taken. For example, the module 100 can vary an intensity, a timing and/or a frequency of the physical disturbance created by the source of disturbance 202. As mentioned above, the source of disturbance 202 can be a source of vibrations or a source of heat, among other possibilities.

Figure 13:
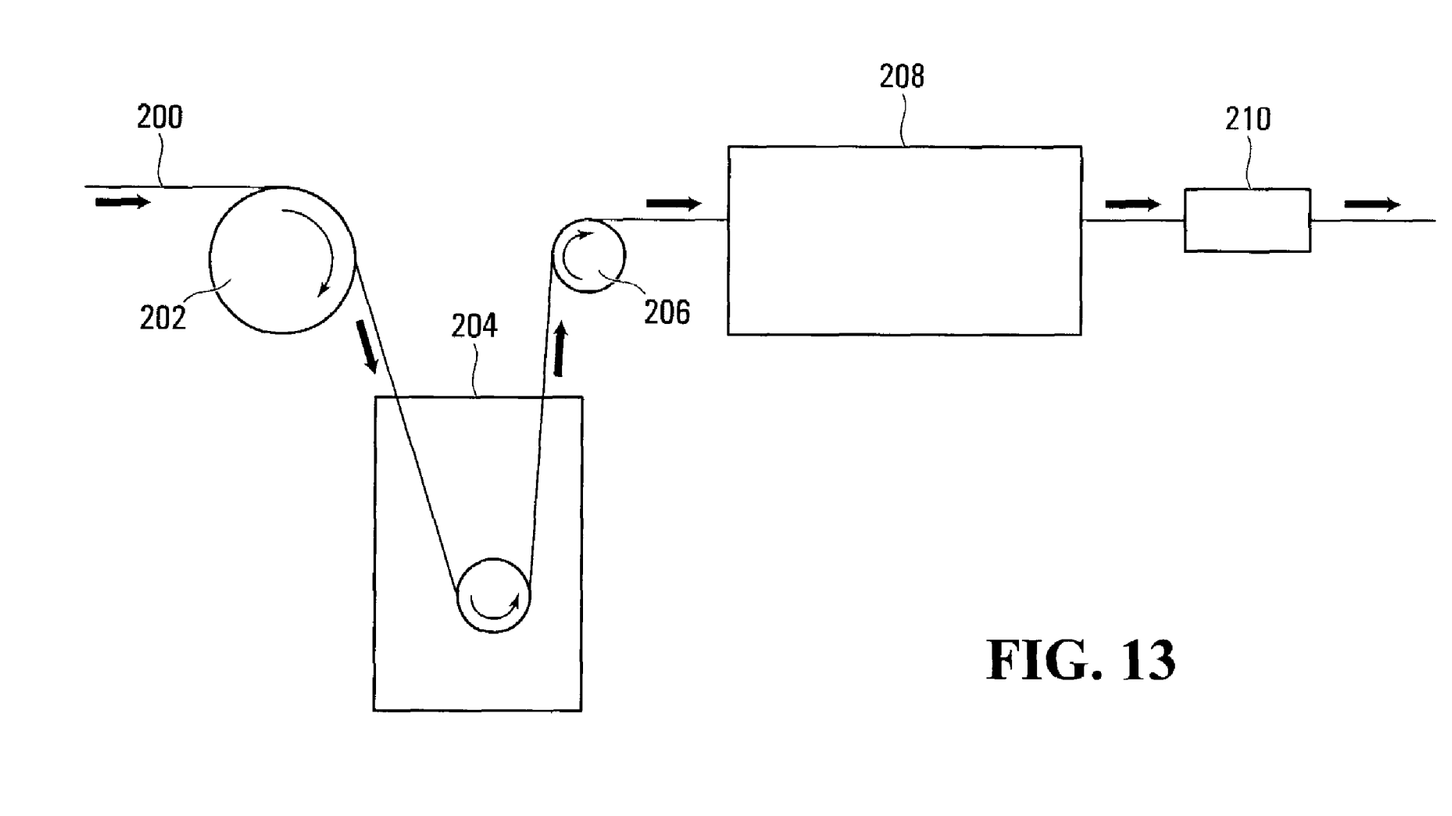
FIG. 13 diagrammatically illustrates an apparatus for writing a grating on an optical fiber, according to another embodiment of the present invention.

FIG. 13 illustrates an embodiment of an apparatus 250 for writing a grating on an optical fiber 200. The apparatus 250 is designed to implement a continuous process during which the coating of the optical fiber 200 is removed to expose the glass or other transparent material of the optical fiber 200, the grating is written, and then a new coating is provided to the optical fiber 200. In some embodiments, the original coating and the new coating of the optical fiber 200 may be made of a polymeric material (e.g., acrylic).

The optical fiber 200 is supplied from a reel or from any other source (not shown). The optical fiber 200 is directed by a first roll 202 in a container 204 that contains acid that can dissolve the coating of the optical fiber 200. The choice of acid will depend on the type of coating that is provided on the optical fiber 200. The optical fiber 200 leaves the container 204 without any coating thereon and it is directed by a second roller 206 toward a first processing station 208 where the grating is written. In one embodiment, the grating may be written by exposing the glass or other transparent material to ultraviolet (UV) radiation that will permanently create the grating. In another embodiment, the grating may be formed by an etching process carried out on the glass or other transparent material. The optical fiber 200 then leaves the first processing station 208 and enters a second processing station 210 that creates a new coating on the optical fiber 200. In one embodiment, the second processing station 210 may be designed as a die that has an opening through which the glass or other transparent material of the optical fiber 200 is threaded. As the optical fiber 200 passes through the opening, a synthetic material is injected therein to form the new coating. The choice of coating material depends on the intended application. As the optical fiber 200 leaves the die, the synthetic material is fully or substantially cured to permit manipulation of the optical fiber 200 downstream of the second processing station 210.

Any one of the first roll 202 and the second roll 206 supporting the optical fiber 200 through the apparatus 250 can be made a driving roll in order to advance the optical fiber 200 at any suitable speed. In one embodiment, the various operations performed on the optical fiber 200, such as removal of the coating, creation of the grating and re-coating are conducted in a way that does not require the optical fiber 200 to stop at any one of those stations. However, if anyone of those operations requires the optical fiber 200 to stop momentarily, a drive system and an associated control device can be used such as to advance the optical fiber 200 step wise and cause it to stop for a necessary time period at the station that requires it.

In a possible variant, the apparatus 250 may be designed to process an optical fiber on which a sensor has already been formed. The purpose of the processing in this case is to remove the existing coating and to replace it with a new coating that is more suitable to the intended application. In this variant, the first processing station 208 may be omitted or unused. Hence, the optical fiber may passe in the container 204 to remove the coating and then go directly to the second processing station 210 for application of the new coating.

Although various embodiments have been illustrated, this was for the purpose of describing, but not limiting, the invention. Various modifications will become apparent to those skilled in the art and are within the scope of this invention, which is defined more particularly by the appended claims.

The invention claimed is:

1. A method for obtaining information regarding a sensor in an optical path, the sensor enabling measurement of a given physical parameter via optical signaling over the optical path, said method comprising:
    providing a tag in the optical path and associated with the sensor, the tag being responsive to an optical signal propagating along the optical path, to produce a response that depends on a particular physical parameter adjacent to the tag;
    inducing a variation of the particular physical parameter; and
    processing the response of the tag upon having induced the variation of the particular physical parameter to derive the information regarding the sensor.

2. A method as claimed in claim 1, wherein the sensor is responsive to an optical signal propagating along the optical path to produce a response that serves to measure the given physical parameter.

3. A method as claimed in claim 2, wherein the optical signal to which the tag is responsive is different from the optical signal to which the sensor is responsive.

4. A method as claimed in claim 1, wherein the particular physical parameter is one of temperature, mechanical strain, and magnetic field intensity.

5. A method as claimed in claim 1, wherein said optical path includes an optical fiber.

6. A method as claimed in claim 1, wherein the optical signal to which the tag is responsive is wavelength multiplexed.

7. A method as claimed in claim 1, wherein the optical signal to which the tag is responsive is time-domain multiplexed.

8. A method as claimed in claim 5, wherein each of the sensor and the tag includes a component selected from a group consisting of a Bragg grating, a long period grating, a blazed grating, a chirp grating, an apodized grating, a non-reflective grating, a non-dispersive grating, and a predetermined axial profile of refractive index of the optical fiber.

9. A method as claimed in claim 1, wherein the particular physical parameter is the given physical parameter.

10. A method as claimed in claim 1, wherein the particular physical parameter is different from the given physical parameter.

11. A method as claimed in claim 1, wherein the given physical parameter is one of temperature, pressure, mechanical strain, and electromagnetic field intensity and the particular physical parameter is one of temperature, mechanical strain, and magnetic field intensity.

12. A method as claimed in claim 5, wherein the tag comprises a grating in the optical fiber.

13. A method as claimed in claim 12, wherein the grating includes one of a Bragg grating, a long-period grating, a blazed grating, a chirp grating, an apodized grating, a non-reflective grating, and a non-dispersive grating.

14. A method as claimed in claim 12, wherein the grating is a first grating, the sensor comprising a second grating in the optical fiber.

15. A method as claimed in claim 14, wherein each of the first grating and the second grating includes one of a Bragg grating, a long-period grating, a blazed grating, a chirp grating, an apodized grating, a non-reflective grating, and a non-dispersive grating.

16. A method as claimed in claim 1, wherein the particular physical parameter is temperature and said inducing comprises causing the temperature to increase at different sites along the optical path.

17. A method as claimed in claim 16, wherein said causing comprises causing a heat to propagate along the optical path.

18. A method as claimed in claim 17, wherein said causing comprises causing movement of a heating element movable along the optical path.

19. A method as claimed in claim 1, wherein the information regarding the sensor comprises information specifying a location of the sensor.

20. A method as claimed in claim 1, wherein said processing comprises noting a time at which the variation of the particular physical parameter arises at the tag.

21. A method as claimed in claim 1, wherein the sensor is a first sensor of a plurality of sensors arranged in series along the optical path.

22. A method as claimed in claim 5, wherein the optical fiber is routed through a conduit.

23. A system for obtaining information regarding a sensor in an optical path, the sensor enabling measurement of a given physical parameter via optical signaling over the optical path, the system comprising:
    a tag in the optical path and associated with the sensor, the tag being responsive to an optical signal propagating along the optical path to produce a response that depends on a particular physical parameter adjacent to the tag;
    a physical parameter variation inducing unit for inducing a variation of the particular physical parameter; and
    a processing entity for processing the response of the tag upon the variation of the particular physical parameter having been induced to derive the information regarding the sensor.

24. A system as claimed in claim 23, wherein the sensor is responsive to an. optical signal propagating along the optical path to produce a response that serves to measure the given physical parameter.

25. A system as claimed in claim 24, wherein the optical signal to which the tag is responsive is different from the optical signal to which the sensor is responsive.

26. A system as claimed in claim 23, wherein the particular physical parameter is one of temperature, mechanical strain, and magnetic field intensity.

27. A system as claimed in claim 23, wherein the optical path includes an optical fiber.

28. A system as claimed in claim 23, wherein the optical signal to which the tag is responsive is wavelength multiplexed.

29. A system as claimed in claim 23, wherein the optical signal to which the tag is responsive is time-domain multiplexed.

30. A system as claimed in claim 27, wherein each of the sensor and the tag includes one of a Bragg grating, a long-period grating, a blazed grating, a chirp grating, an apodized grating, a non-reflective grating, a non-dispersive grating, and a predetermined axial profile of refractive index of the optical fiber.

31. A system as claimed in claim 23, wherein the particular physical parameter is the given physical parameter.

32. A system as claimed in claim 23, wherein the particular physical parameter is different from the given physical parameter 33. A system as claimed in claim 23, wherein the given physical parameter is one of temperature, pressure, mechanical strain, and electromagnetic field intensity and the particular physical parameter is one of temperature, mechanical strain, and magnetic field intensity.

34. A system as claimed in claim 27, wherein the tag comprises a grating in the optical fiber.

35. A system as claimed in claim 34, wherein the grating is one of a Bragg grating, a long-period grating, a blazed grating, a chirp grating, an apodized grating, a non- reflective grating, and a non-dispersive grating.

36. A system as claimed in claim 34, wherein the grating is a first grating, the sensor comprising a second grating in the optical fiber.

37. A system as claimed in claim 36, wherein each of the first grating and the second grating includes one of a Bragg grating, a long-period grating, a blazed grating, a chirp grating, an apodized grating, a non-reflective grating, and a non-dispersive grating.

38. A system as claimed in claim 23, wherein the particular physical parameter is temperature and the physical parameter variation inducing unit is operative to cause the temperature to increase at different sites along the optical path.

39. A system as claimed in claim 38, wherein the physical parameter variation inducing unit is operative to cause heat to propagate along the optical path.

40. A system as claimed in claim 39, wherein the physical parameter variation inducing unit comprises a heating element movable along the optical path.

41. A system as claimed in claim 23, wherein the information regarding the sensor comprises information specifying a location of the sensor.

42. A system as claimed in claim 23, wherein the processing entity is operative to note a time at which the variation of the particular physical parameter arises at the tag.

43. A system as claimed in claim 23, wherein the sensor is a first sensor of a plurality of sensors arranged in series along the optical path.

44. A system as claimed in claim 23, wherein the optical fiber is routed through a conduit.

45. Computer-readable media storing software executable by a computer of a system for obtaining information regarding a sensor in an optical path, the sensor enabling measurement of a given physical parameter via optical signaling over the optical path, the system comprising a tag in the optical path and associated with the sensor, the tag being responsive to an optical signal propagating along the optical path to produce a response that depends on a particular physical parameter adjacent to the tag, the system being operable to induce a variation of the particular physical parameter, the software comprising program code for processing the response of the tag upon the system having induced the variation of the particular physical parameter to derive the information regarding the sensor.

46. A method for identifying a location of a sensor in an optical path, the optical path comprising an optical fiber, the sensor enabling measurement of a given physical parameter via optical signaling over the optical path, the method comprising:
providing a tag in the optical path and associated with the sensor, the tag comprising a grating in the optical fiber, the tag being responsive to an optical signal propagating along the optical path to produce a response that depends on a particular physical parameter adjacent to the tag;
inducing a variation of the particular physical parameter; and
processing the response of the tag upon having induced the variation of the particular physical parameter to identify the location of the sensor.

47. A method as claimed in claim 46, wherein the particular physical parameter is temperature.

48. A system for identifying a location of a sensor in an optical path, the optical path comprising an optical fiber, the sensor enabling measurement of a given physical parameter via optical signaling over the optical path, the system comprising:
a tag in the optical path and associated with the sensor, the tag comprising a grating in the optical fiber, the tag being responsive to an optical signal propagating along the optical path to produce a response that depends on a particular physical parameter adjacent to the tag, the system being operable to induce a variation of the particular physical parameter; and
a processing entity for processing the response of the tag upon the system having induced the variation of the particular physical parameter to identify the location of the sensor.

49. A system as claimed in claim 48, wherein the particular physical parameter is temperature.

* * * * *

UNITED STATES PATENT AND TRADEMARK OFFICE
CERTIFICATE OF CORRECTION

PATENT NO. : 7,672,545 B2 Page 1 of 1
APPLICATION NO. : 11/915361
DATED : March 2, 2010
INVENTOR(S) : André R. Vincelette It is certified that error appears in the above-identified patent and that said Letters Patent is hereby corrected as shown below:

Col. 15, claim 1, line 7:
Remove the "," between the words "path" and "to"

Col. 16, claim 24, line 2:
Remove the "." between the words "an" and "optical"

Signed and Sealed this

Eighth Day of June, 2010

David J. Kappos
*Director of the United States Patent and Trademark Office*